N. ROSENFELD.
APPARATUS FOR AND METHOD OF PREPARING VEGETABLES AND FRUITS.
APPLICATION FILED FEB. 18, 1920.
1,361,776.
Patented Dec. 7, 1920.
2 SHEETS—SHEET 1.
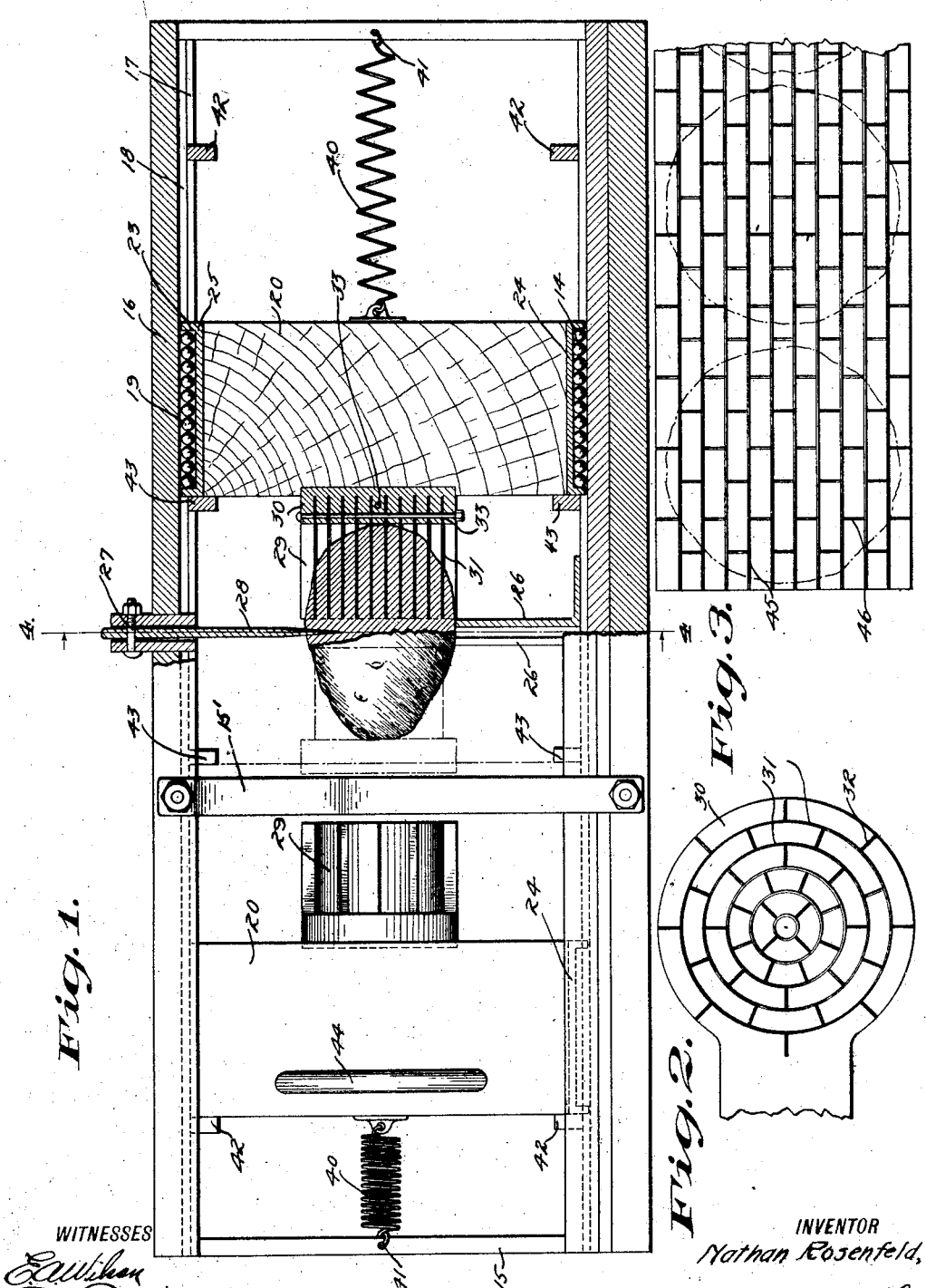
INVENTOR
Nathan Rosenfeld,
ATTORNEYS N. ROSENFELD.
APPARATUS FOR AND METHOD OF PREPARING VEGETABLES AND FRUITS.
APPLICATION FILED FEB. 18, 1920.

1,361,776.

Patented Dec. 7, 1920.
2 SHEETS—SHEET 2.

WITNESSES

INVENTOR
Nathan Rosenfeld,

ATTORNEYS

UNITED STATES PATENT OFFICE.

NATHAN ROSENFELD, OF BROOKLYN, NEW YORK, ASSIGNOR OF ONE-HALF TO BERNHARD GLUCK, OF BROOKLYN, NEW YORK.

APPARATUS FOR AND METHOD OF PREPARING VEGETABLES AND FRUITS.

1,361,776.     Specification of Letters Patent.     Patented Dec. 7, 1920.

Application filed February 18, 1920. Serial No. 359,521.

*To all whom it may concern:*

Be it known that I, NATHAN ROSENFELD, a citizen of Roumania, and a resident of the city of New York, borough of Brooklyn, in the county of Kings and State of New York, have invented a new and Improved Apparatus for and Method of Preparing Vegetables and Fruits, of which the following is a full, clear, and exact description.

The present invention relates to new and useful improvements in the preparation of vegetables and fruits, and it pertains more particularly to a machine for cutting said vegetables and fruits previous to the cooking operation.

The primary object of the invention is to provide a machine by which certain portions of a potato or similar food product may be cut throughout a portion of its body to permit of the access of the material in which the article is subsequently cooked.

We have found by actual experiment that potatoes, apples and similar articles of food, when prepared in accordance with the present invention will greatly increase in size during the cooking operation, and at the same time will assume shapes and configurations of a novel formation.

With the above and other objects in view, reference is to be had to the accompanying drawings in which—

Figure 1 is a view partly in elevation and partly in section showing the method of cutting the article of food.

Fig. 2 is a detail view in end elevation of the preferred form of cutter.

Fig. 3 is a view in elevation of a slightly modified form of cutter.

Figure 4:
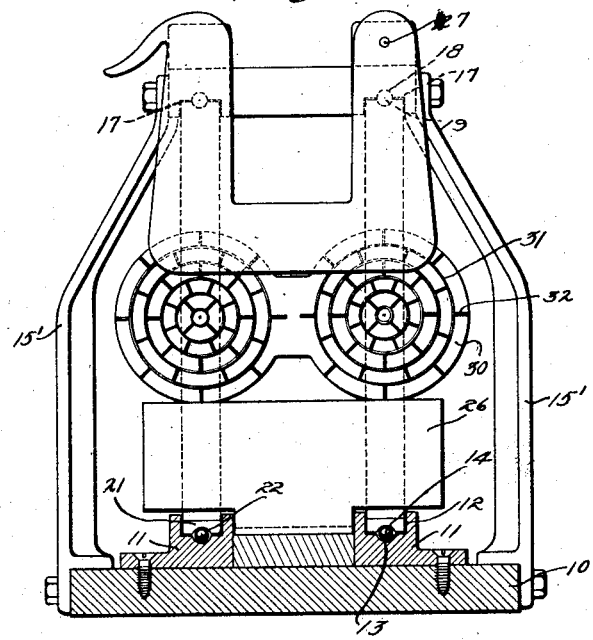
Fig. 4 is a vertical sectional view taken on the line 4—4 of Fig. 1.

Referring more particularly to the drawings, the device comprises a base 10, upon the upper face of which are mounted in spaced relation two guides 11. Each of these guides is provided in its upper face with a channel 12, the bottom wall of which is grooved, as indicated by the reference character 13, to provide a recess for balls, or the like 14, the purpose of which will be hereinafter more specifically set forth.

Arranged above the base 10, and supported by means of vertical standards 15 and braces 15', is a plate 16, and as best shown in Fig. 4, the plate is provided with two channels 17, which overlie the channels 12 in the guides 11. These channels 17 are provided with grooves 18 adapted to receive the balls 19 shown in dotted lines in Fig. 4.

Mounted between the guides 11 and the plate 16 are blocks 20, and said blocks are provided on their lower faces with track members 21, which are grooved as at 22 to receive the balls 14 heretofore mentioned. The upper face of each of the blocks 20 is provided with a groove 23 in which the balls 19 are mounted. These balls 14 and 19 are carried in channel members 24 and 25, respectively, and the channel members 25 are adapted for sliding movement within the grooves 17 of the plate 16 as shown in Fig. 4.

Carried by the base 10 and arranged in spaced relation to each other, are two brackets 26, and secured to the plate 16 by means of a bolt 27, and depending therefrom is a knife 28, which later overlies the two brackets 26 as shown in Fig. 1.

Rigidly carried by the inner face of each of the blocks 20 is a knife 29, the specific construction of which is more clearly shown in Fig. 2. These knives comprise a base portion 30 to which is secured a plurality of circular knives 31 arranged concentrically to each other. Connecting the circular knives 31 are radially disposed knives 32, said radially disposed knives 32 being offset with respect to each other. The circular knives 31 are secured to the base 30 by means of transversely extending bolts 33, which pass through the base 30 and the knives 31.

Secured to the opposite face of each of the blocks 20 is a coil spring 40, and said coil spring is connected at its other end to the vertical standards 15, as at 41, these springs serving to automatically return the blocks after the cutting operation. Arranged near each end of the frame are stops 42 which limit the movement of the blocks 20 when they are moved away from a central position by means of their respective springs 40. Arranged near the center of the frame are stops 42 which limit the movement of the blocks during the cutting operation. Each of the blocks is provided with a handle 44, by means of which it is moved to the center of the frame to perform the cutting operation.

In the form of knife shown in Fig. 3, instead of employing a plurality of concentrically arranged circular knives 31, longitudinally extending knives 45 are employed, and said longitudinal knives 45 are connected by means of short transverse knives 46 which are arranged in staggered relation to each other.

Figure 5:
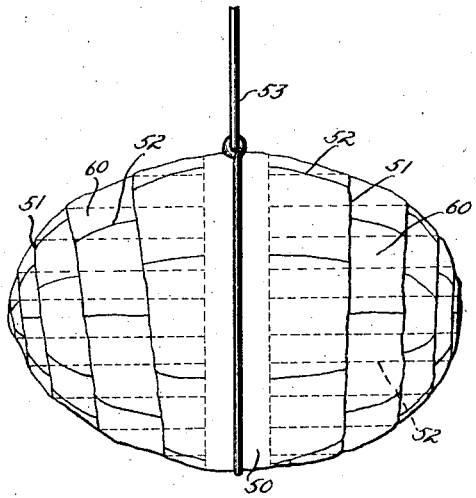
Fig. 5 is a view in elevation of the article of food after it has been subjected to the cutting operation.

The operation of the device is as follows: A potato or similar article of food is placed upon the brackets 26, as shown in Fig. 1. When the article of food has been so positioned the knife 28 is dropped downwardly until it engages the article of food, as shown in Fig. 1, and serves to maintain the same in position on the brackets 26. The operating handles 44 are now grasped and the blocks moved simultaneously toward the center of the machine, the knives entering the article of food from the ends and cutting the same, as shown in Fig. 5.

By the arrangement of the stops 43 it will be seen that that portion of the article of food between its ends, and designated by the reference character 50, is not cut, but is left in its solid form, the size of this portion of the article of food being determined by the position of the stops 43.

After the article of food has been subjected to the cutting operation, heretofore described, the same comes from the machine cut with a plurality of circular kerfs 51 and a plurality of longitudinally extending kerfs 52.

After the article of food has been cut, a wire or other suitable device 53 is passed around the uncut body portion 50 thereof and said wire forms a supporting means for the article of food during the cooking operation.

Figure 6:
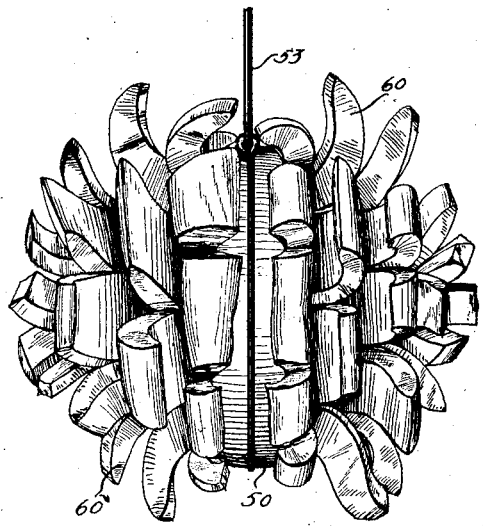
Fig. 6 is a view in elevation of the article of food after it has been subjected to the cooking operation.

After the wire 53 has been attached to the article of food it is submerged in boiling water or grease, as may be desired, to cook the same. As the article of food begins to absorb the grease or water during the cooking operation the several projections formed by the circular kerfs 51 and the longitudinal kerfs 52 curl backwardly upon the body portion as indicated by the reference character 60 in Fig. 6. By prolonging the cooking operation these projections may be caused to curl back to a position where they will entirely hide the body portion 50 of the article of food.

By making the knives in various designs it will be apparent that the article of food may be cooked in such a manner as to assume various shapes and configurations, and by multiplying the number of knives employed the number of projections 60 may be correspondingly increased at will, thus increasing the size of the cooked article.

Claims:

1. A machine of the character described comprising a frame, a suitable support arranged intermediate of the ends of said frame, a plurality of sliding blocks mounted in said frame and movable toward said support, and cutting elements carried by said sliding blocks, substantially as described.

2. A machine of the character described comprising a frame, an article support arranged centrally of said frame, a plurality of sliding blocks movable manually toward said article support, means for automatically returning said sliding blocks to their starting position, a plurality of stops for limiting the movement of said sliding blocks in both directions, and oppositely disposed knives carried by said sliding blocks.

3. A machine of the character described comprising a frame, a plurality of blocks carried by said frame, and movable toward and away from each other, and knives carried by said blocks, said knives being oppositely disposed with relation to each other as and for the purpose set forth.

4. A machine of the character described comprising a frame, a plurality of sliding blocks carried by said frame and movable toward and away from each other, a plurality of stops carried by said frame and adapted to limit the movement of said sliding blocks, said knives being oppositely disposed with respect to each other.

5. A method of preparing vegetables and fruit for cooking which consists of cutting them throughout the major part of their body portion to provide a plurality of separated projecting portions adapted to curl outwardly during the cooking operation.

6. A method of preparing vegetables and fruits for cooking, which consists of cutting them in such a manner as to provide an uncut body portion and a plurality of individual projecting portions, each of which is an integral part of said uncut body portion and adapted to curl upon subjection to cooking action.

NATHAN ROSENFELD.

Witness:
ISRAEL HERMELIN.